United States Patent Office 3,546,079
Patented Dec. 8, 1970

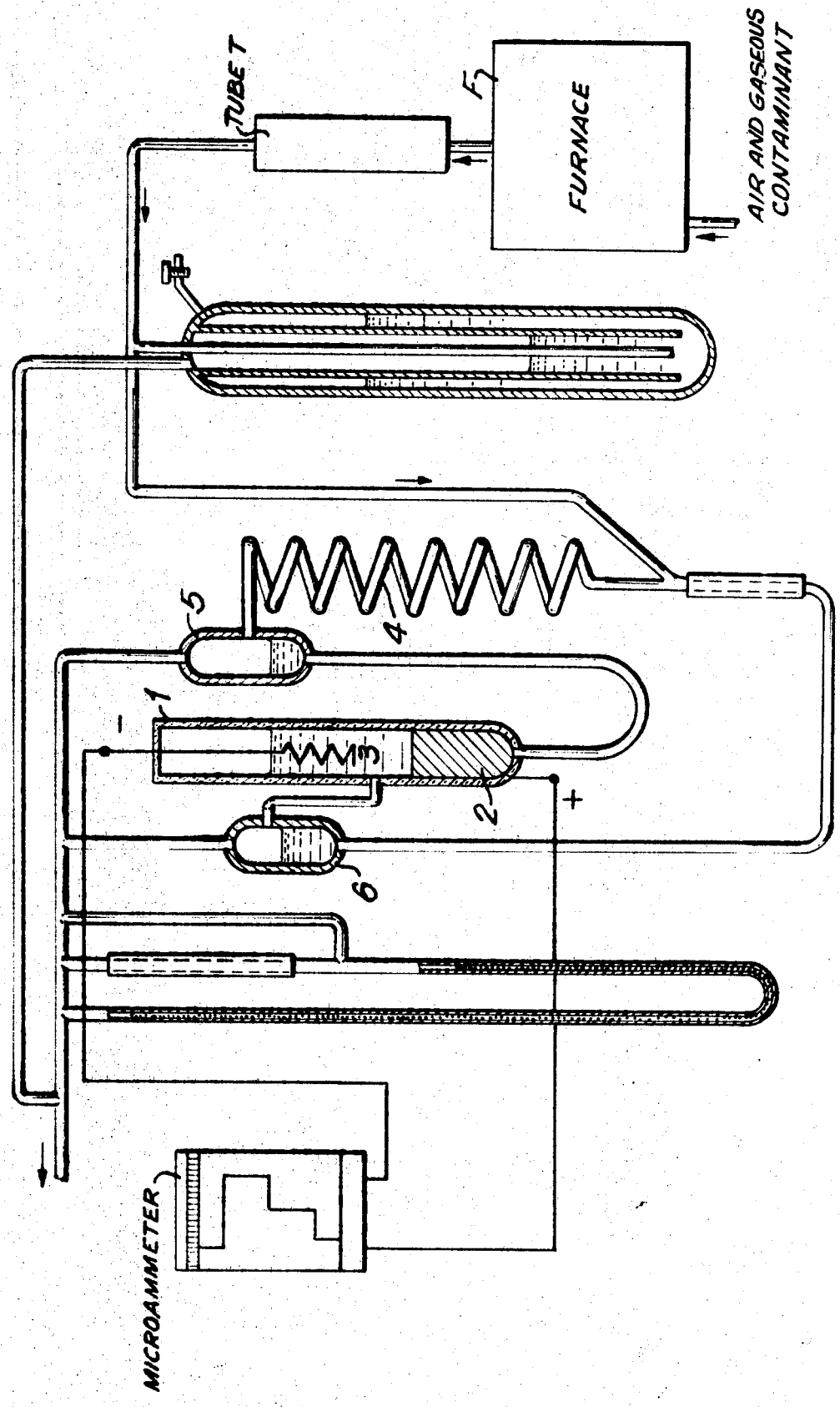

3,546,079
METHOD FOR DETERMINING CONTINUOUSLY SMALL CONCENTRATIONS OF GASEOUS HALOGENATED COMPOUNDS AND OF HYDROGEN HALIDES IN AIR AND IN OTHER GASES
Jerzy Waclawik, Kasprowicza 59m8, Warsaw, Poland, and Stefan Waszak, Lechilow 14–16, Piaseczno-Golkow k. Warszawy, Poland
Filed Feb. 8, 1967, Ser. No. 614,537
Claims priority, application Poland, Feb. 8, 1966, P 112,839
Int. Cl. G01n 27/00, 27/42
U.S. Cl. 204—1       6 Claims

ABSTRACT OF THE DISCLOSURE

A method in which a gas contaminated with a small concentration of gaseous halogenated organic compounds or hydrogen halides or both is continuously passed through a furnace at 800° C. filled with a palladium catalyst whereby the contaminants are burned to form a combustion product which is a hydrogen halide, a halogen or both. Thereafter, the combustion product is passed into contact with a bromide-bromate mixture or an iodide-iodate mixture whereby the combustion produtcs are quantitatively converted into the free halogen, which can be determiend by known continuous methods, preferably in the galvanic cell of a gas analyzer.

BRIEF DESCRIPTION OF THE DRAWING

The sole figure is a diagrammatic representation of an apparatus for effecting the process of the invention.

DETAILED DESCRIPTION OF THE INVENTION

The invention relates to a method for continuously determining gaseous halogenated organic compounds, such as trichloroethylene, tetrachloroethylene, chloroform, methyl bromide, or phosgene, and hydrogen halides, such as hydrogen chloride, hydrogen bromide, or hydrogen fluoride, which are borne in air or in other gases as contaminants present in very small amounts on the order of 0.02 p.p.m. The method contemplates the conversion of the halogen combined in the organic compound into a free halogen which is later determined by any well known method, such, for example, as by the method described in Polish Pat. 50,961.

The known methods of determination involve either colorimetric determination of individual compounds or absorption in a suitable medium followed by determination by various periodic methods. However, these methods cannot insure an accurate quantitative determination; they are mostly qualitative or semi-quantitative in nature and, in addition, they are laborious and time-consuming.

On the other hand, the existing continuous methods, especially the infra-red or ultraviolet absorption methods, require the use of a very expensive apparatus.

Another known method involves combustion of the above-mentioned organic compounds in a quartz vessel packed with quartz blocks or with a metallic platinum wire or foil. The resulting mixture of halogen and hydrogen halide is absorbed in a suitable medium and then individual components are successively determined. This method not only requires the use of very high temperatures on the order of 950°–1100° C. for combustion, but it fails to insure an accurate determination as well.

The above-mentioned disadvantages may be eliminated if the halogen combined in the organic compound is converted into a free halogen by the method according to the present invention.

For this purpose, air or another gas contaminated with halogenated organic compounds and//or hydrogen halides is passed continuously through a furnace filled with a palladium catalyst at a temperature of about 800° C. In the furnace, the contaminants are quantitatively burned to yield the corresponding hydrogen halide, halogen, or both. Then the combustion products from the furnace are passed through a tube filled with a bromide-bromate mixture or an iodide-iodate mixture or through a washer filled with an aqueous solution of the respective salts. During this operation, the combustion products are quantitatively converted into the halogen which is subsequently determiend by any of several well known methods.

However, is is preferred to determine the halogen in the galvanic cell of a gas analyzer. This method of determination of halogens and a suitable gas analyzer have been described in Polish Pat. 50,961 and will be described in greater detail below. The method involves bringing a halogen or a hydrogen halide into contact with the electrolyte in the cell containing a bromide and bromate mixture or an iodide and iodate mixture, with its subsequent dissolution. The electrolyte together with the dissolved gas is introduced into a galvanic cell containing two electrodes, one made of silver or another metal insoluble in the electrolyte and the other made of a more noble metal of a relatively large surface area. The dissolved halogen to be determined is reduced at one electrode by electrons supplied by the other electrode through the external circuit of the cell. The concentration of the gas is determined from the intensity of the current which flows through the external circuit as the cell operates. This is a simple, sensitive and accurate method which requires no additional sources of electric energy; in addition, it may be utilized in signalling systems.

If the galvanic method is used, the combustion products obtained according to the present invention may be passed directly into an electrolyte solution which contains a bromide and bromate mixture or an iodide and iodate mixture.

The invention will next be described in conjunction with the following example.

Air contaminated with gaseous trichloroethylene in amounts up to 3.0 p.p.m. was passed at a constant rate through a furnace F at a temperature of 800° C. filled with a palladium catalyst. In the furnace, trichloroethylene was quantitatively burned to yield carbon dioxide and, in part, chlorine and hydrogen chloride. Then the combustion products were passed through a tube T filled with a bromide-bromate mixture to release an equivalent amount of bromine, which was subsequently determined by the method and in the apparatus described in Polish Pat. 50,961. Briefly, this was effected by forming an electrolyte containing said mixture, adding said electrolyte to a galvanic cell comprising a housing 1 made of glass or another material which is resistant to both the action of the gas to be examined and the electrolyte employed, a gold electrode 2 having a large surface area in the form of a foil, and a silver electrode 3. The cell is filled with a solution of potassium chloride in hydrochloric acid.

The cell is connected with the spiral 4 and container 6 by means of separator 5. The determination of chlorine by the method according to the invention consists in passing air of constant speed through the spiral 4 in which the gas comes into contact with the electrolyte. In the separator 5, the gas is separated from liquid, the gas flows outwardly and the electrolyte, together with the chlorine dissolved therein, flows to the galvanic cell, in which, on gold electrode 2 the reduction of chlorine to chloride ions takes place, while the silver electrode oxidizes to silver ions according to the reaction:

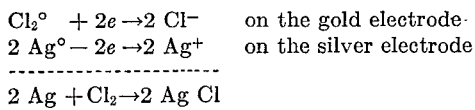

$$2\text{ Ag} + \text{Cl}_2 \rightarrow 2\text{ Ag Cl}$$

After passing through the galvanic cell, the electrolyte flows to the container 6 from which it thereafter flows to the spiral 4. Thus the electrolyte circulates in a closed cycle.

To the outer circuit of the cell a microammeter is connected, measuring the intensity of the current flowing during the work of the cell. The concentration of chlorine in the gas is proportional to the intensity of this current.

Using an automatic registration to a Fe=Konstantan thermocell (not shown) it is possible to determine from 0.00 to 3.00 p.p.m. of chlorine with an accuracy up to 0.3 p.p.m., and with the use of a compensator (scaled from 0 to 2 mv.) (also not shown) it is possible to determine from 0.00 to 1.5 p.p.m. with an accuracy up to 0.02 p.p.m. After a certain working time of the cell, the silver electrode 3 is subjected to regeneration, i.e. to the reduction of formed silver chloride to silver.

What is claimed is:

1. A method for continuously determining small concentrations of gaseous halogenated organic compounds and hydrogen halides in a gas, said method comprising passing a gas contaminated with a small concentration of gaseous halogenated organic compounds, hydrogen halides or mixtures thereof continuously through a furnace at a temperature of 800° C., containing a palladium catalyst, such that the contaminants are burned to form a combustion product which is the corresponding hydrogen halide, halogen, or mixture, then passing the combustion product into contact with a bromide-bromate mixture or an iodide-iodate mixture thereby to quantitatively convert the combustion products into the halogen, and subsequently determining the presence of the halogen in said mixture to thereby determine the concentration of the contaminants in the gas.

2. A method as claimed in claim 1 wherein said bromide-bromate mixture or iodide-iodate mixture is in a tube and the combustion product is passed therethrough.

3. A method as claimed in claim 1 wherein said bromide-bromate mixture or iodide-iodate mixture is in aqueous solution.

4. A method as claimed in claim 1 wherein said bromide-bromate mixture or iodide-iodate mixture is contained in an electrolyte of a galvanic cell, the combustion products being passed directly into the electrolyte, the concentration of the contaminants in the gas being determined by the current intensity in an external circuit connected to the cell.

5. A method as claimed in claim 1 wherein the concentration of the contaminants is less than 3.0 p.p.m.

6. A method as claimed in claim 5 wherein the concentration of the contaminants is 0.02 p.p.m.

References Cited

UNITED STATES PATENTS

| 2,593,878 | 4/1952 | Haines et al. | 23—232 |
| 2,907,639 | 10/1959 | Paumier et al. | 23—254 |
| 3,001,917 | 9/1961 | Scheirer | 204—195 |
| 3,230,046 | 1/1966 | Berzoa | 23—232X |
| 3,234,117 | 2/1966 | Rost et al. | 204—195 |

FOREIGN PATENTS

| 50,961 | 2/1966 | Poland | 204—1 |

G. L. KAPLAN, Primary Examiner

U.S. Cl. X.R.

23—232